(12) United States Patent
Horinouchi et al.

(10) Patent No.: US 12,460,075 B2
(45) Date of Patent: Nov. 4, 2025

(54) RESIN COMPOSITION FOR MOLDING AND MOLDED ARTICLE

(71) Applicant: SEKISUI CHEMICAL CO., LTD., Osaka (JP)

(72) Inventors: Tomohiro Horinouchi, Yamaguchi (JP); Mitsuo Matsumoto, Yamaguchi (JP); Ryota Yamasugi, Yamaguchi (JP); Yoshito Arai, Osaka (JP); Yasunari Kusaka, Osaka (JP); Nami Nakajima, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 858 days.

(21) Appl. No.: 17/760,601

(22) PCT Filed: Sep. 29, 2020

(86) PCT No.: PCT/JP2020/036995
§ 371 (c)(1),
(2) Date: Mar. 15, 2022

(87) PCT Pub. No.: WO2021/065941
PCT Pub. Date: Apr. 8, 2021

(65) Prior Publication Data
US 2022/0348755 A1    Nov. 3, 2022

(30) Foreign Application Priority Data
Sep. 30, 2019    (JP) ................. 2019-179356

(51) Int. Cl.
*C08L 27/24* (2006.01)

(52) U.S. Cl.
CPC ........... *C08L 27/24* (2013.01); *C08L 2205/02* (2013.01); *C08L 2205/06* (2013.01)

(58) Field of Classification Search
CPC ..................................................... C08L 27/24
See application file for complete search history.

(56) References Cited

U.S. PATENT DOCUMENTS

| | | | | |
|---|---|---|---|---|
| 7,439,293 B2 * | 10/2008 | Perkins | ................. | C09K 21/14 |
| | | | | 524/437 |
| 2016/0200893 A1 | 7/2016 | Matsumura et al. | | |
| 2017/0183491 A1 | 6/2017 | Matsumura et al. | | |
| 2020/0165433 A1 | 5/2020 | Taniguchi et al. | | |

FOREIGN PATENT DOCUMENTS

| | | | | |
|---|---|---|---|---|
| JP | 9-263669 | 10/1997 | | |
| JP | 10-120912 | 5/1998 | | |
| JP | 2000-186113 | 7/2000 | | |
| JP | 2003-112357 | 4/2003 | | |
| JP | 6291612 | 3/2018 | | |
| WO | WO-03074274 A1 * | 9/2003 | ............. | B32B 27/30 |
| WO | 2015/046456 | 4/2015 | | |
| WO | 2016/013638 | 1/2016 | | |
| WO | 2019/065739 | 4/2019 | | |

OTHER PUBLICATIONS

English Machine Translation of JPH10120912 (A) obtained on Feb. 14, 2025 from https://worldwide.espacenet.com/publicationDetails/biblio?DB=EPODOC&II=0&ND=3&adjacent=true&locale=en_EP&FT=D&date=19980512&CC=JP&NR=H10120912A&KC=A (Year: 1998).*
Mitsui Chemicals datasheet (Hi-Wax 220 P,2016). (Year: 2016).*
Honeywell additives for PVC Injection molding (AC-629A, 2022) (Year: 2022).*
Tianswax datasheet (2022). (Year: 2022).*
International Search Report issued Dec. 22, 2020 in International (PCT) Application No. PCT/JP2020/036995.

* cited by examiner

*Primary Examiner* — Catherine S Branch
*Assistant Examiner* — Olga Lucia Donahue
(74) *Attorney, Agent, or Firm* — WENDEROTH, LIND & PONACK, L.L.P.

(57) ABSTRACT

The present invention provides a resin composition for molding having excellent thermal meltability and capable of providing a molded article that is less likely to crack from a resin weld during use and has excellent surface gloss, and a molded article including the resin composition for molding. Provided is a resin composition for molding, containing: a chlorinated polyvinyl chloride resin; a polyvinyl chloride resin; and a melt additive, the resin composition having an area ratio of a peak B observed in a range of 0.6 to 1.0 ppm to a peak A observed in a range of 9.5 to 10 ppm (Area of peak B/Area of peak A) of 1 to 1,000 when a $^1$H NMR spectrum is measured by solution NMR.

16 Claims, No Drawings

RESIN COMPOSITION FOR MOLDING AND MOLDED ARTICLE

TECHNICAL FIELD

The present invention relates to a resin composition for molding having excellent thermal meltability and capable of providing a molded article that is less likely to crack from a resin weld during use and has excellent surface gloss, and a molded article including the resin composition for molding.

BACKGROUND ART

Polyvinyl chloride resins (hereinafter referred to as "PVCs") have been used in a wide range of fields because of their excellent mechanical strength, weather resistance, and chemical resistance. However, PVCs have poor heat resistance, and thus chlorinated polyvinyl chloride resins (hereinafter referred to as "CPVCs"), which are polyvinyl chloride resins chlorinated to have improved heat resistance, have been developed. PVCs have a low thermal deformation temperature and cannot be used with hot water because the upper limit temperature at which they can be used is around 60° C. to 70° C., whereas CPVCs have a thermal deformation temperature higher than PVCs by as much as 20° C. to 40° C., and thus can be used with hot water. For example, CPVCs are suitably used for heat-resistant pipes, heat-resistant joints, heat-resistant valves, and heat-resistant plates.

However, as compared with the common PVCs, CPVCs have high viscosity and long stress relaxation time. This causes molded articles of CPVCs, such as pipes, to have poor surface (inner surface) smoothness. A pipe with poor inner surface smoothness is difficult to use as an ultrapure water pipe or a lined pipe for plants, because such a pipe is susceptible to stagnation due to irregularities, and therefore susceptible to bacteria growth and dust accumulation.

In response to this, Patent Literature 1 discloses a molded article containing a resin composition, wherein the resin composition contains a chlorinated polyvinyl chloride resin having a chlorine content of 64 to 68% by weight and an oxidized polyethylene wax having an acid value of 15 to 25 and a weight average molecular weight of 2,000 to 3,500.

Patent Literature 2 discloses a molded article containing a resin composition, wherein the resin composition contains a polyvinyl chloride resin, such as a post-chlorinated polyvinyl chloride resin, as well as a rubber shock absorber having a glass transition temperature of 0° C. or lower and a modified olefin wax having a percentage of a specific polar group of 0.1 to 50% by mass, an acid value of 30 to 80 mgKOH/g, and a density of 895 to 960 kg/m³.

CITATION LIST

Patent Literature

Patent Literature 1: JP 2003-112357 A
Patent Literature 2: JP 6291612 B

SUMMARY OF INVENTION

Technical Problem

However, molded articles obtained from the resin compositions disclosed in Patent Literatures 1 and 2 have low weld strength at a joining interface, which is an interface formed when flows of resin entering the die or mold join together during extrusion molding or injection molding. As a result, such molded articles may crack from a weld during use, causing trouble such as water leakage.

In view of the above issues in the prior art, the present invention aims to provide a resin composition for molding having excellent thermal meltability and capable of providing a molded article that is less likely to crack from a resin weld during use and has excellent surface gloss, and a molded article including the resin composition for molding.

Solution to Problem

The present invention relates to a resin composition for molding, containing: a chlorinated polyvinyl chloride resin; a polyvinyl chloride resin; and a melt additive, the resin composition having an area ratio of a peak B observed in a range of 0.6 to 1.0 ppm to a peak A observed in a range of 9.5 to 10 ppm (Area of peak B/Area of peak A) of 1 to 1,000 when a $^1$H NMR spectrum is measured by solution NMR.

The present invention is described in detail below.

The present inventors have found out that a molded article having excellent thermal meltability and less likely to crack from a resin weld during use can be obtained by using a resin composition for molding which contains a chlorinated polyvinyl chloride resin, a polyvinyl chloride resin, and a melt additive and in which the areas of specific peaks A and B satisfy a predetermined relation as measured by solution NMR. Moreover, the inventors also have found out that a molded article having excellent surface gloss can be obtained by using the resin composition for molding. The inventors thus completed the present invention.

(Chlorinated Polyvinyl Chloride Resin)

The resin composition for molding of the present invention contains a chlorinated polyvinyl chloride resin.

The chlorinated polyvinyl chloride resin preferably contains structural units (a) to (c) represented by the following formulas (a) to (c).

[Chem. 1]

  (a)

  (b)

  (c)

In the chlorinated polyvinyl chloride resin, the proportion of the structural unit (a) based on the total number of moles of the structural units (a), (b), and (c) is preferably 5 mol % or more, more preferably 30.0 mol % or more, still more preferably 35.0 mol or more. The proportion of the structural unit (a) is preferably 90 mol % or less, more preferably 70 mol % or less, still more preferably 60 mol % or less.

The proportion of the structural unit (b) based on the total number of moles of the structural units (a), (b), and (c) is preferably 5 mol % or more, more preferably 10 mol % or more, still more preferably 15 mol % or more. The proportion of the structural unit (b) is preferably 40 mol % or less, more preferably 30 mol % or less, still more preferably 25.0 mol % or less.

The proportion of the structural unit (c) based on the total number of moles of the structural units (a), (b), and (c) is preferably 5 mol % or more, more preferably 10 mol % or more, still more preferably 25 mol or more, and preferably 55 mol % or less, more preferably 40 mol % or less.

Such a chlorinated polyvinyl chloride resin shows uniform gelling characteristics in melt kneading and can provide a molded article with less unevenness on the surface.

The molar ratios of the structural units (a), (b), and (c) in the chlorinated polyvinyl chloride resin reflect the site to which chlorine is introduced at the time of chlorination of the polyvinyl chloride resin (PVC). The PVC prior to chlorination is in a state where the proportion of the structural unit (a) is 100 mol %, and the proportions of the structural units (b) and (C) are 0 mol %. As chlorination proceeds, the proportion of the structural unit (a) decreases, while the proportions of the structural units (b) and (c) increase. At this time, nonuniformity of the chlorinated state will increase in a case where the proportion of the structural unit (b), which is unstable, excessively increases, or in a case where the chlorinated site and the unchlorinated site are unevenly present within the same particle of the chlorinated polyvinyl chloride resin. Increased nonuniformity causes variations in gelling characteristics in melt kneading of the chlorinated polyvinyl chloride resin, which will greatly impair the smoothness of the surface of a molded article.

In contrast, in the present invention, owing to the molar ratios of the structural units (a), (b), and (c) adjusted within the above range, the chlorinated polyvinyl chloride resin has high uniformity and can exhibit good gelling characteristics in melt kneading.

The molar ratios of the structural units (a), (b), and (c) in the chlorinated polyvinyl chloride resin can be measured by molecular structure analysis using NMR. NMR analysis can be performed in conformity with the method described in R. A. Komoroski, R. G. Parker, J. P. Shocker, Macromolecules, 1985, 18, 1257-1265.

Preferably, the chlorinated polyvinyl chloride resin contains two components including a $A_{100}$ component and a $B_{100}$ component, and has a percentage of the $B_{100}$ component of 20% or less, the two components being identified by measuring the chlorinated polyvinyl chloride resin by a solid echo method using pulse NMR at 100° C. to give a free induction decay curve of $^1H$ spin-spin relaxation, and subjecting the free induction decay curve to waveform separation into two curves derived from the $A_{100}$ component and the $B_{100}$ component in order of shorter relaxation time using the least square method. The percentage of the $B_{100}$ component herein means [$B_{100}$ component/($A_{100}$ component+ $B_{100}$ component)].

When the percentage of the $B_{100}$ component is within the above range, the processability and the unevenness-preventing properties of a molded article can be improved, making it possible to produce a molded article having high surface smoothness. In addition, cracking during use of a molded article can be prevented.

The percentage of the $B_{100}$ component is more preferably 5% or more and is more preferably 15% or less.

Herein, pulse NMR refers to an analysis involving detecting a response signal to a pulse to obtain a $^1H$ nuclear magnetic relaxation time of a sample. A free induction decay curve may be obtained as a pulse response. The free induction decay curve consists of overlapped multiple free induction decay curves derived from multiple components having different relaxation times. The relaxation times or the components thereof of the components having different relaxation times can be identified by waveform separation of the curve using the least square method. The analysis involving separation into three components using pulse NMR described above is a known technique. Examples of literatures describing the technique include JP 2018-2983 A.

The $A_{100}$ component is a component having a short relaxation time in pulse NMR measurement and refers to a hard component with low molecular mobility. The $B_{100}$ component is a component having a long relaxation time in pulse NMR measurement and refers to a soft component with high molecular mobility.

In the chlorinated polyvinyl chloride resin, the percentage of the $A_{100}$ component [$A_{100}$ component/($A_{100}$ component+ $B_{100}$ component)] is preferably 80% or more and is preferably 95% or less.

The relaxation time of the $A_{100}$ component is usually 0.020 milliseconds (hereafter, referred to as ms) or less. The relaxation time of the $B_{100}$ component is usually 0.020 ms or more and less than 0.090 ms.

The relaxation time of the $A_{100}$ component is preferably 0.001 ms or more and preferably 0.020 ms or less.

The ratio of the relaxation time of the $B_{100}$ component to the relaxation time of the $A_{100}$ component (Relaxation time of $B_{100}$ component/Relaxation time of $A_{100}$ component) is preferably 1 or more and is preferably 90 or less.

In the chlorinated polyvinyl chloride resin, the proportion of the structural unit (a) and the percentage of the $B_{100}$ component preferably satisfy the following relation:

$$0.01 \leq (\text{Proportion of structural unit } (a)/\text{Percentage of } B_{100} \text{ component}) \leq 25.$$

In the chlorinated polyvinyl chloride resin, the chlorine content is more than 56.8% by mass, and the amount of added chlorine is preferably 3.3% by mass or more and is preferably 15.3% by mass or less.

When the amount of added chlorine is 3.3% by mass or more, a molded article to be obtained has sufficient heat resistance. When the amount of added chlorine is 15.3% by mass or less, moldability is improved.

The amount of added chlorine is more preferably 6.3% by mass or more and is more preferably 12.3% by mass or less.

A polyvinyl chloride resin typically has a chlorine content of 56.7% by mass. The amount of added chlorine means the proportion of chlorine introduced into a polyvinyl chloride resin, and can be measured by the method specified in JIS K 7229.

In the chlorinated polyvinyl chloride resin, the amount of added chlorine and the percentage of the $B_{100}$ component preferably satisfy the following relation:

$$0.05 \leq (\text{Amount of added chlorine/Percentage of } B_{100} \text{ component}) \leq 5.0.$$

The chlorinated polyvinyl chloride resin may have any degree of polymerization, and preferably has a degree of polymerization of 400 to 2,000, more preferably 500 to 1,500.

The degree of polymerization within the above range makes it possible to achieve both thermal meltability during molding and the strength of a molded article.

The chlorinated polyvinyl chloride resin preferably has a weight average molecular weight of 1,000 or more and 1,000,000 or less, more preferably 5,000 or more and 500,000 or less. The weight average molecular weight is a polystyrene equivalent weight average molecular weight and can be measured by gel permeation chromatography (GPC). Examples of columns used in measuring the weight average molecular weight include Shodex LF-804 (produced by Showa Denko K.K.).

The chlorinated polyvinyl chloride resin may be produced by, for example, a method including preparing a suspension in a reaction vessel by suspending a polyvinyl chloride resin in an aqueous medium, introducing chlorine into the reaction vessel, and heating the suspension to chlorinate the polyvinyl chloride resin.

The percentage of the $B_{100}$ component can be adjusted by changing conditions for the chlorination of the polyvinyl chloride resin, such as pressure, temperature, chlorine concentration, hydrogen peroxide concentration, chlorine consumption rate, or stirring conditions.

The reaction vessel may be a commonly used vessel such as a glass-lined stainless steel reaction vessel or a titanium reaction vessel, for example.

The method of preparing the suspension of the polyvinyl chloride resin in an aqueous medium is not limited. For example, a cake-like PVC obtained by subjecting a polymerized PVC to monomer removal treatment may be used, or a dried PVC may be resuspended in an aqueous medium, or a suspension obtained by removing any substance undesired for the chlorination reaction from the polymerization system may be used. It is preferred to use a cake-like resin obtained by subjecting a polymerized PVC to monomer removal treatment.

Chlorine to be introduced into the reaction vessel may be either liquid chlorine or gaseous chlorine. The use of liquid chlorine is efficient in that a large amount of chlorine can be charged into the reaction vessel in a short period of time. Chlorine may be added in the course of reaction to adjust the pressure or supply chlorine. At this time, gaseous chlorine in addition to liquid chlorine may be blown into the reaction vessel, as required. It is preferred to use chlorine after purging 5 to 10% by mass of chlorine from the cylinder.

The gauge pressure in the reaction vessel is not limited. Yet, it is preferably from 0 to 2 MPa, because the higher the chlorine pressure is, the more readily the chlorine will penetrate into the PVC particles.

The method of chlorinating the PVC in the suspended state is not limited. Examples of the chlorination method include a method in which the excitation of bonding of the PVC and chlorine is brought about by thermal energy to accelerate the chlorination (hereinafter referred to as thermal chlorination); and a method in which light energy such as ultraviolet light is applied to accelerate the chlorination by photoreaction (hereinafter referred to as photo-chlorination). The heating method in the chlorination by thermal energy is not limited, and for example, heating with an external jacket from the reactor wall is effective.

The use of light energy such as ultraviolet light requires an apparatus capable of light energy irradiation such as ultraviolet irradiation under high temperature and high pressure conditions. In the photo-chlorination, the chlorination reaction temperature is preferably 40° C. to 80° C. In the photo-chlorination, the ratio of the light energy irradiation intensity (W) to the total amount (kg) of the raw material PVC and water is preferably 0.001 to 6 (W/kg). The irradiation light preferably has a wavelength of 280 to 420 nm.

In the above chlorination method, preferably, the chlorination is performed while the suspension is stirred. The suspension is stirred preferably under such conditions that the ratio of the vortex volume (unit: L) to the total mass (kg) of the raw material PVC and water is 0.009 to 0.143.

When the ratio is 0.009 or more, chlorine in the gas phase in the reaction vessel can be sufficiently taken in the liquid phase. When the ratio is 0.143 or less, the chlorine taken in the liquid phase is less likely to be re-released into the gas phase, allowing uniform chlorination.

The vortex volume means the volume of a vortex formed at the liquid-gas interface during stirring.

For example, the vortex volume can be calculated using thermal fluid and powder analysis software "R-FLOW" (produced by R-flow Corporation Ltd.).

Specifically, the vortex volume can be calculated based on the distance between the center of the stirring blade and the interface between the gas phase and the liquid phase in stirring. The stirring blade, which is the stirring power source, produces pressure in the liquid in stirring and sets the liquid phase at a positive pressure and the gas phase at a negative pressure. This makes it possible to determine the interface between the gas phase and the liquid phase as the border between the positive pressure and the negative pressure.

The stirring blade rotation rate in stirring is preferably 10 to 500 rpm. The capacity of the vessel is preferably 0.01 m$^3$ to 100 m$^3$.

(Polyvinyl Chloride Resin)

The resin composition for molding of the present invention contains a polyvinyl chloride resin.

The polyvinyl chloride resin used may be a vinyl chloride homopolymer, or may be a copolymer of a vinyl chloride monomer and a monomer with unsaturated bond(s) that is copolymerizable with the vinyl chloride monomer, a graft copolymer obtained by graft-copolymerizing a vinyl chloride monomer to a polymer, or the like. These polymers may be used singly or in combinations of two or more.

Examples of the monomer with unsaturated bond(s) that is copolymerizable with the vinyl chloride monomer include α-olefins, vinyl esters, vinyl ethers, (meth)acrylates, aromatic vinyls, vinyl halides, and N-substituted maleimides. These monomers may be used singly or in combinations of two or more.

Examples of the α-olefins include ethylene, propylene, and butylene.

Examples of the vinyl esters include vinyl acetate and vinyl propionate.

Examples of the vinyl ethers include butyl vinyl ether and cetyl vinyl ether.

Examples of the (meth)acrylates include methyl (meth) acrylate, ethyl (meth)acrylate, butyl acrylate, and phenyl methacrylate.

Examples of the aromatic vinyls include styrene and α-methyl styrene.

Examples of the vinyl halides include vinylidene chloride and vinylidene fluoride.

Examples of the N-substituted maleimides include N-phenyl maleimide and N-cyclohexyl maleimide.

The polymer to which vinyl chloride is graft copolymerized is not limited as long as vinyl chloride can be graft copolymerized. Examples of such a polymer include ethylene copolymers, acrylonitrile-butadiene copolymers, polyurethane, chlorinated polyethylene, and chlorinated polypropylene. These may be used singly or in combination of two or more.

Examples of the ethylene copolymers include ethylene-vinyl acetate copolymers, ethylene-vinyl acetate-carbon monoxide copolymers, ethylene-ethyl acrylate copolymers, ethylene-butyl acrylate-carbon monoxide copolymers, ethylene-methyl methacrylate copolymers, and ethylene-propylene copolymers.

The polyvinyl chloride resin has a chlorine content of 56.8% by mass or less.

When the chlorine content is within the above range, the resin composition for molding has better moldability and a molded article to be obtained has higher heat resistance. The chlorine content is preferably 36.8 to 56.8% by mass.

The average chlorine content of the chlorinated polyvinyl chloride resin and the polyvinyl chloride resin is preferably 65 to 68% by mass. When the average chlorine content is within the above range, heat resistance and moldability can be ensured.

The average chlorine content of the chlorinated polyvinyl chloride resin and the polyvinyl chloride resin is determined by multiplying the chlorine content of the chlorinated polyvinyl chloride resin and the chlorine content of the polyvinyl chloride resin by, respectively, the content ratio of the chlorinated polyvinyl chloride resin and the content ratio of the polyvinyl chloride resin, and adding up the resulting products.

The polyvinyl chloride resin preferably has a degree of polymerization of 400 or more and preferably 1,000 or less. When the degree of polymerization is within the above range, a product satisfactory in both thermal meltability and product strength can be obtained. The degree of polymerization of the PVC is more preferably 500 or more and is more preferably 800 or less.

The difference in the degree of polymerization between the chlorinated polyvinyl chloride resin and the polyvinyl chloride resin is preferably 500 or less. When the difference in the degree of polymerization is within the above range, a product satisfactory in both thermal meltability and product strength can be obtained. The difference is more preferably 300 or less.

In the resin composition for molding of the present invention, the lower limit of the amount of the polyvinyl chloride resin is preferably 1 part by mass, and the upper limit thereof is preferably 30 parts by mass based on 100 parts by mass of the chlorinated polyvinyl chloride resin.

Addition of the polyvinyl chloride resin within this range further improves thermal stability, as well as maintaining favorable appearance of the resulting molded article.

The lower limit of the amount of the polyvinyl chloride resin is more preferably 5 parts by mass, and the upper limit thereof is more preferably 20 parts by mass.

The amount of the polyvinyl chloride resin in the entire resin composition for molding of the present invention is preferably 2 to 18% by mass.

(Melt Additive)

The resin composition for molding of the present invention contains a melt additive.

The melt additive can decrease the flow viscosity of molten resin during molding processing, improving the surface smoothness of the resulting molded article. Moreover, the melt additive makes it possible to obtain a molded article that is less likely to crack from a resin weld due to external factors, high pressure loads, or fluctuations.

The melt additive has an area ratio of a peak B observed in a range of 0.6 to 1.0 ppm to a peak A observed in a range of 9.5 to 10 ppm (Area of peak B/Area of peak A) of preferably 1 or more and preferably 1,000 or less when a $^1$H NMR spectrum is measured by solution NMR. The area ratio is more preferably 5 or more, still more preferably 10 or more, further preferably 15 or more, and more preferably 900 or less, still more preferably 700 or less, further preferably 500 or less.

Specifically, the solution NMR involves dissolving the melt additive in o-dichlorobenzene-$d_4$ (orthodichlorobenzene-$d_4$) at 130° C. In particular, any undissolved matter needs to be removed using a filter or the like. The dissolved matter can be measured by 400 MHz $^1$H NMR at 130° C.

The peak A observed in the range of 9.5 to 10 ppm is a peak derived from an aldehyde group. The area of the peak A means the integral from 9.5 to 10 ppm.

The peak B observed in the range of 0.6 to 1.0 ppm is a peak derived from a terminal methyl group. The area of the peak B means the integral from 0.6 to 1.0 ppm.

The melt additive may be produced by the following method, for example.

First, polyethylene or/and polyolefin is/are prepared by a conventionally known process. Examples of the process include low pressure processes (the Ziegler process, the metallocene catalyst process) and middle pressure processes (the Phillips process, the Standard Oil process). Specifically, a triethylaluminum-titanium tetrachloride solid composite, which is a Ziegler-Natta catalyst, is used as a catalyst, and paraffin, naphthene, a lower aliphatic hydrocarbon, or the like is used as a solvent. Ethylene is blown into the solvent under normal pressure or a pressure of about several atmospheres, and polymerized at a solution temperature of about 60° C. to 100° C. The resulting slurry-like polymerized product is then washed with water to separate and collect the solvent, and dried to prepare polyethylene or/and polyolefin.

Next, the polyethylene or/and polyolefin is/are melted, and to the molten product is introduced oxygen or oxygen-containing gas to cause oxidation reaction to produce the melt additive.

The oxidation process is preferably carried out in a stirring tank reactor.

The oxidation process involves spraying oxygen or oxygen-containing gas in the reactor, filling the reactor with refined polyethylene or/and polyolefin, and heating the polyethylene or/and polyolefin. The heating temperature is preferably 130° C. to 170° C., more preferably 140° C. to 160° C.

Subsequently, oxygen or oxygen-containing gas is fed to the reactor at an oxygen flow rate of 0.5 to 1.5 L per minute per kilogram of the total of polyethylene or/and polyolefin. The pressure inside the reactor is adjusted via a control valve on the outlet side, preferably to 0.5 to 1.0 MPa. After the initial introduction stage, oxidation begins and generates heat. The reactor is thus preferably cooled with an internal cooling coil or an external jacket.

The temperature during reaction is preferably maintained at 130° C. to 170° C., more preferably 140° C. to 160° C.

Sampling is conducted hourly in advance to measure the Area of peak B/Area of peak A by the solution NMR, so as to generate a calibration curve.

The flow of the gas is stopped when the time that the desired area ratio is obtained is reached, and the reactor is aerated to an atmospheric pressure.

The polyethylene or polyolefin preferably has a weight average molecular weight of 1,000 or more, more preferably 3,000 or more, still more preferably 5,000 or more, and preferably 1,000,000 or less, more preferably 200,000 or less, still more preferably 50,000 or less. The weight average molecular weight can be measured by a method in conformity with JIS-K-7367-1 (viscosity method).

The polyethylene or polyolefin preferably has a melting point of 60° C. or higher, more preferably 80° C. or higher, still more preferably 90° C. or higher, and preferably 150° C. or lower, more preferably 145° C. or lower, still more preferably 140° C. or lower.

The melting point can be measured by differential scanning calorimetry (DSC), for example.

The polyethylene or polyolefin preferably has a density of 650 kg/m$^3$ or more, more preferably 800 kg/m$^3$ or more, and preferably 1,100 kg/m$^3$ or less, more preferably 1,000 kg/m$^3$ or less.

The density can be measured by a method in conformity with JIS K 7112.

The polyethylene or polyolefin preferably has a crystallinity of 30% or more, more preferably 50% or more, still more preferably 61% or more, particularly preferably 70% or more, and preferably 99% or less, more preferably 90% or less, still more preferably 85% or less. The polyethylene or polyolefin having a crystallinity within the above range makes it possible to achieve excellent thermal meltability, prevent cracking during use, and produce a molded article having excellent surface gloss.

The crystallinity can be measured by X-ray diffractometry, for example.

The polyethylene or polyolefin preferably has a softening point of 70° C. or higher, more preferably 90° C. or higher, still more preferably 100° C. or higher, and preferably 155° C. or lower, more preferably 150° C. or lower, still more preferably 145° C. or lower. The softening point can be measured by a method in conformity with JIS K 2207, for example.

The melt additive preferably contains structural units represented by the following formulas (1) to (3).

[Chem. 2]

In the formula (2), X represents at least one selected from the group consisting of an alkyl group, a halogen group, a carboxy group, a hydroxy group, an acetyl group, an acryloyl group, a cyano group, an acrylamide group, a phenyl group, and an ether group.

In the melt additive, the proportion of the structural unit (1) based on the total number of moles of the structural units (1) to (3) is preferably 50 mol % or more, more preferably 80 mol % or more. The proportion of the structural unit (1) is preferably 99.998 mol % or less, more preferably 98 mol % or less.

The proportion of the structural unit (2) is preferably 0.001 mol % or more, more preferably 1 mol % or more. The proportion of the structural unit (2) is preferably 49 mol % or less, more preferably 30 mol % or less.

The proportion of the structural unit (3) is preferably 0.001 mol % or more, more preferably 0.1 mol % or more. The proportion of the structural unit (3) is preferably 1 mol % or less, more preferably 0.5 mol % or less.

The proportions of the structural units (1) to (3) can be measured by molecular structure analysis using NMR, for example.

The melt additive preferably has a weight average molecular weight of 1,000 or more, more preferably 3,000 or more, still more preferably 5,000 or more, and preferably 1,000,000 or less, more preferably 200,000 or less, still more preferably 50,000 or less.

The weight average molecular weight can be measured by a method in conformity with JIS-K-7367-1 (viscosity method).

In the resin composition for molding of the present invention, the ratio of the weight average molecular weight of the melt additive to the weight average molecular weight of the chlorinated polyvinyl chloride resin (Weight average molecular weight of melt additive/Weight average molecular weight of chlorinated polyvinyl chloride resin) is preferably 0.01 or more and 0.55 or less. The weight average molecular weight ratio is more preferably 0.02 or more and 0.50 or less, still more preferably 0.05 or more and 0.30 or less. The weight average molecular weight ratio within the above range makes it possible to achieve excellent thermal meltability, prevent cracking during use, and produce a molded article having excellent surface gloss.

When the melt additive contains the structural units represented by the formulas (1) to (3), the structural units represented by the formulas (1) to (3) may be arranged in a random or block manner. The melt additive may have any terminal. Examples thereof include a hydrogen atom, a halogen atom, a hydroxy group, and an aldehyde group. In a preferred embodiment, the melt additive contains the structural units represented by the formulas (1) to (3), and is terminated with at least one selected from the group consisting of a hydrogen atom, a halogen atom, a hydroxy group, and an aldehyde group.

In the structural unit represented by the formula (2), X represents at least one selected from the group consisting of an alkyl group, a halogen group, a carboxy group, a hydroxy group, an acetyl group, an acryloyl group, a cyano group, an acrylamide group, a phenyl group, and an ether group. In particular, X is preferably at least one selected from the group consisting of a hydroxy group, a carboxy group, and an ether group. Here, the ether group has an alkyl group bonded to one end thereof.

In the resin composition for molding of the present invention, the ratio of the structural unit (2) content of the melt additive to the structural unit (a) content of the chlorinated polyvinyl chloride resin (Structural unit (2) content of melt additive/Structural unit (a) content of chlorinated polyvinyl chloride resin) is preferably 0.01 or more and 1.0 or less. The ratio is more preferably 0.05 or more and 0.8 or less, more preferably 0.06 or more and 0.5 or less. The ratio within the above range makes it possible to achieve excellent thermal meltability, prevent cracking during use, and produce a molded article having excellent surface gloss.

The melt additive preferably has a melting point of 60° C. or higher, more preferably 80° C. or higher, still more preferably 90° C. or higher, particularly preferably 95° C. or higher, particularly preferably 110° C. or higher, and preferably 150° C. or lower, more preferably 145° C. or lower, still more preferably 140° C. or lower. The melting point within the above range makes it possible to achieve excellent thermal meltability, prevent cracking during use, and produce a molded article having excellent surface gloss.

The melting point can be measured by differential scanning calorimetry (DSC), for example.

The melt additive preferably has a density of 650 kg/m³ or more, more preferably 800 kg/m³ or more, and preferably 1,100 kg/m³ or less, more preferably 1,000 kg/m³ or less.

The density can be measured by a method in conformity with JIS K 7112, for example.

The melt additive preferably has a crystallinity of 30% or more, more preferably 50% or more, still more preferably 70% or more, and preferably 99% or less, more preferably 90% or less, still more preferably 85% or less.

The crystallinity can be measured by X-ray diffractometry.

The melt additive preferably has a softening point of 70° C. or higher, more preferably 90° C. or higher, still more preferably 100° C. or higher, and preferably 155° C. or lower, more preferably 150° C. or lower, still more preferably 145° C. or lower. The softening point can be measured by a method in conformity with JIS K 2207, for example.

The melt additive preferably has a melt viscosity at 170° C. of 10 to 3,000 mPa·s, more preferably 50 to 2,000 mPa·s, still more preferably 100 to 1,000 mPa·s. The melt viscosity can be measured using a dynamic viscoelasticity measuring apparatus, for example.

In the resin composition for molding of the present invention, the amount of the melt additive based on 100 parts by mass of the chlorinated polyvinyl chloride resin is preferably 0.01 parts by mass or more, more preferably 0.02 parts by mass or more, still more preferably 0.1 parts by mass or more, particularly preferably 0.5 parts by mass or more. The amount of the melt additive based on 100 parts by mass of the chlorinated polyvinyl chloride resin is preferably 18 parts by mass or less, more preferably 13 parts by mass or less, still more preferably 10 parts by mass or less, particularly preferably 7.5 parts by mass or less. The melt additive contained in an amount within the above range makes it possible to provide a molded article having excellent surface smoothness without scorching or foaming during molding.

(Other Additives)

The resin composition for molding of the present invention may optionally contain additives such as thermal stabilizers, lubricants, processing aids, impact modifiers, heat resistance improvers, antioxidants, ultraviolet absorbents, light stabilizers, fillers, and pigments.

Examples of the thermal stabilizers include, but not limited to, organotin stabilizers, lead stabilizers, calcium-zinc stabilizers, barium-zinc stabilizers, and barium-cadmium stabilizers.

Examples of the organotin stabilizers include dibutyl tin mercapto, dioctyl tin mercapto, dimethyl tin mercapto, dibutyl tin mercapto, dibutyl tin maleate, dibutyl tin maleate polymers, dioctyl tin maleate, dioctyl tin maleate polymers, dibutyl tin laurate, and dibutyl tin laurate polymers.

Examples of the lead stabilizers include lead stearate, dibasic lead phosphite, and tribasic lead sulfate. These may be used singly or in combination of two or more thereof.

In the resin composition for molding of the present invention, the thermal stabilizer content based on 100 parts by mass of the chlorinated polyvinyl chloride resin is preferably 0.4 parts by mass or more, more preferably 0.6 parts by mass or more, and preferably 10 parts by mass or less, more preferably 7 parts by mass or less. A thermal stabilizer contained in an amount within the above range can further improve thermal stability while maintaining good appearance of a molded article.

Examples of the lubricants include internal lubricants and external lubricants. Internal lubricants are used to reduce the flow viscosity of molten resin during molding processing and thus prevent the generation of frictional heat. Examples of the internal lubricants include, but not limited to, higher alcohol esters such as butyl stearate, higher alcohols such as lauryl alcohol and stearyl alcohol, polyalcohol esters such as glycerol monostearate, higher fatty acids such as stearic acid, and bisamides. These may be used singly or in combination of two or more thereof. Note that the lubricants are different from the melt additive.

External lubricants are used to improve the slip effect between molten resin and a metal surface during molding processing. Examples of the external lubricants include, but not limited to, ester waxes such as fatty acid ester lubricants. These may be used singly or in combination of two or more thereof.

Examples of the processing aids include, but not limited to, acrylic processing aids such as alkyl acrylate-alkyl methacrylate copolymers having a mass average molecular weight of 100,000 to 2,000,000. Examples of the acrylic processing aids include, but not limited to, n-butyl acrylate-methyl methacrylate copolymers and 2-ethylhexyl acrylate-methyl methacrylate-butyl methacrylate copolymers. These may be used singly or in combination of two or more thereof.

Examples of the impact modifiers include, but not limited to, styrene-conjugated diene copolymers such as methyl methacrylate-butadiene-styrene copolymers (MBS) and acrylonitrile-butadiene-styrene copolymers (ABS), acrylic copolymers, chlorinated polyethylene, and acrylic rubber.

Examples of the heat resistance improvers include, but not limited to, α-methylstyrene resins and N-phenylmaleimide resins.

Examples of the antioxidants include, but not limited to, phenolic antioxidants.

Examples of the light stabilizers include, but not limited to, hindered amine light stabilizers.

Examples of the ultraviolet absorbents include, but not limited to, salicylate ultraviolet absorbents, benzophenone ultraviolet absorbents, benzotriazole ultraviolet absorbents, and cyanoacrylate ultraviolet absorbents.

Examples of the fillers include, but not limited to, calcium carbonate and talc.

Examples of the pigments include, but not limited to, organic pigments such as azo pigments, phthalocyanine pigments, threne pigments, and dye lake pigments; and inorganic pigments such as oxide pigments, molybdenum chromate pigments, sulfide/selenide pigments, and ferrocyanide pigments.

(Resin Composition for Molding)

The resin composition for molding of the present invention has an area ratio of a peak B observed in a range of 0.6 to 1.0 ppm to a peak A observed in a range of 9.5 to 10 ppm (Area of peak B/Area of peak A) of preferably 1 or more and preferably 1,000 or less when a $^1$H NMR spectrum is measured by solution NMR. The area ratio of the peak B is more preferably 10 or more, still more preferably 20 or more, further preferably 50 or more, and more preferably 900 or less, still more preferably 700 or less, further more preferably 500 or less.

Specifically, the solution NMR involves dissolving the melt additive in o-dichlorobenzene-$d_4$ (orthodichlorobenzene-$d_4$) at 130° C. In particular, any undissolved matter needs to be removed using a filter or the like. The dissolved matter can be measured by 400 MHz $^1$H NMR at 130° C.

The peak A observed in the range of 9.5 to 10 ppm is a peak derived from an aldehyde group. The area of the peak A means the integral from 9.5 to 10 ppm.

The peak B observed in the range of 0.6 to 1.0 ppm is a peak derived from a terminal methyl group. The area of the peak B means the integral from 0.6 to 1.0 ppm.

Preferably, the resin composition for molding of the present invention contains three components including a $A_{100}$ component, a $B_{100}$ component, and a $C_{100}$ component, and has a percentage of the $C_{100}$ component of 50% or less, the three components being identified by measuring the resin composition by a solid echo method using pulse NMR at 100° C. to give a free induction decay curve of $^1$H spin-spin relaxation, and subjecting the free induction decay curve to waveform separation into three curves derived from the $A_{100}$ component, the $B_{100}$ component, and the $C_{100}$ component in order of shorter relaxation time using the least square method.

The percentage of the $C_{100}$ component means [$C_{100}$ component/($A_{100}$ component+$B_{100}$ component+$C_{100}$ component)].

When the percentage of the $C_{100}$ component is within the above range, the processability and unevenness-preventing properties of a molded article can be improved, making it possible to produce a molded article having high surface smoothness. In addition, cracking during use of a molded article can be prevented.

The percentage of the $C_{100}$ component is preferably 10% or more, more preferably 40% or less.

In the resin composition for molding of the present invention, the percentage of the $A_{100}$ component [$A_{100}$ component/($A_{100}$ component+$B_{100}$ component+$C_{100}$ component)] is preferably 30% or more and preferably 70% or less.

In the resin composition for molding of the present invention, the percentage of the $B_{100}$ component [$B_{100}$ component/($A_{100}$ component+$B_{100}$ component+$C_{100}$ component)] is preferably 1% or more and preferably 20% or less.

The percentages of the $A_{100}$ component, $B_{100}$ component, and $C_{100}$ component in the resin composition for molding can be adjusted by appropriately setting the structure of the chlorinated polyvinyl chloride resin, the proportions of the chlorinated polyvinyl chloride resin and the polyvinyl chloride resin, the proportion of the melt additive, and the structure of the melt additive, for example.

In the resin composition for molding of the present invention, the proportion of the structural unit (a) in the chlorinated polyvinyl chloride resin and the percentage of the $C_{100}$ component preferably satisfy the following relation.

$0.05 \leq$ [Proportion of structural unit (*a*) in chlorinated polyvinyl chloride resin/Percentage of $C_{100}$ component in resin composition for molding] $\leq 15$ In the resin composition for molding of the present invention, the amount of added chlorine in the chlorinated polyvinyl chloride resin and the percentage of the $C_{100}$ component preferably satisfy the following relation.

$0.005 \leq$ (Amount of added chlorine in chlorinated polyvinyl chloride resin/Percentage of $C_{100}$ component in resin composition for molding) $\leq 5.0$ In the resin composition for molding of the present invention, the amount of added chlorine in the chlorinated polyvinyl chloride resin and the percentage of the $B_{100}$ component preferably satisfy the following relation.

$0.01 \leq$ (Amount of added chlorine in chlorinated polyvinyl chloride resin/Percentage of $B_{100}$ component in resin composition for molding) $\leq 20$ The resin composition for molding of the present invention may be produced by, for example, a method including mixing the chlorinated polyvinyl chloride resin with the polyvinyl chloride resin, the melt additive, and other additives.

Any mixing method may be used. Examples thereof include a hot blending method and a cold blending method.

In addition, a molded article molded from the resin composition for molding of the present invention is provided. The present invention also encompasses such a molded article.

The molding method may be any conventionally known molding method, for example, extrusion molding or injection molding.

The molded article of the present invention has excellent thermal stability and good appearance. Therefore, the molded article of the present invention can be suitably used in applications such as building components, plumbing materials and equipment, and housing materials.

Advantageous Effects of Invention

The present invention can provide a resin composition for molding having excellent thermal meltability and capable of providing a molded article that is less likely to crack from a resin weld during use and has excellent surface gloss, and a molded article including the resin composition for molding.

DESCRIPTION OF EMBODIMENTS

The present invention is hereinafter described in more detail with reference to examples; however, the present invention should not be limited to the examples.

(Preparation of Chlorinated Polyvinyl Chloride Resin A)

A glass-lined reaction vessel having an inner capacity of 300 L was charged with 130 kg of deionized water and 50 kg of a polyvinyl chloride resin having an average degree of polymerization of 800. They were stirred to disperse the polyvinyl chloride resin in water to prepare an aqueous suspension, and then the inside of the reaction vessel was heated to raise the temperature of the aqueous suspension to 70° C. Subsequently, the inside of the reaction vessel was depressurized to remove oxygen (oxygen content 100 ppm). Thereafter, while stirring was performed such that the vortex formed at the liquid-gas interface by stirring had a vortex volume of 2.2 L, chlorine (oxygen content 50 ppm) was introduced at a partial pressure of chlorine of 0.04 MPa, and then irradiation of ultraviolet light having a wavelength of 365 nm was performed at an irradiation intensity of 350 W with a high-pressure mercury lamp, thereby starting chlorination reaction.

Then, the chlorination temperature was kept at 70° C. and the partial pressure of chlorine was kept at 0.04 MPa. The average chlorine consumption rate was adjusted to 0.02 kg/PVC-kg·5 min. When the amount of added chlorine reached 10.6% by mass, the irradiation of ultraviolet light with the high-pressure mercury lamp and the supply of chlorine gas were terminated, whereby chlorination was terminated.

Next, unreacted chlorine was removed by nitrogen gas aeration, followed by washing with water, dehydration, and drying. Accordingly, a powdery chlorinated polyvinyl chloride resin A (amount of added chlorine: 10.6% by mass) was obtained.

(Evaluation of Chlorinated Polyvinyl Chloride Resin)
(1) Measurement of Amount of Added Chlorine The amount of added chlorine in the obtained chlorinated polyvinyl chloride resin was measured in conformity with JIS K 7229.

(2) Molecular Structure Analysis

The molecular structure of the obtained chlorinated polyvinyl chloride resin was analyzed in conformity with the NMR measurement method described in R. A. Komoroski, R. G. Parker, J. P. Shocker, Macromolecules, 1985, 18, 1257-1265 so as to determine the amount of the structural units (a), (b), and (c).

The NMR measurement conditions were as follows.
Apparatus: FT-NMRJEOLJNM-AL-300
Measured nuclei: 13C (proton complete decoupling)
Pulse width: 90°
PD: 2.4 sec
Solvent: o-dichlorobenzene:deuterated benzene (C5D5)= 3:1
Sample concentration: about 20%
Temperature: 110° C.
Reference material: central signal for benzene set to 128 ppm
Number of scans: 20,000

(3) Pulse NMR Measurement

The obtained chlorinated polyvinyl chloride resin was placed in a glass sample tube having a diameter of 10 mm (produced by BRUKER, Product No. 1824511, 10 mm in diameter, 180 mm in length, flat bottom) so as to fall within the measurement range of a pulse NMR apparatus. The sample tube was set in the pulse NMR apparatus (produced by BRUKER, "the minispec mq20") and subjected to measurement by the solid echo method at 100° C. (after holding for 20 minutes) under the conditions below, thereby obtaining a free induction decay curve of $^1$H spin-spin relaxation.

<Solid Echo Method>

Scans: 128 times

Recycle delay: 1 sec

Acquisition scale: 1.0 ms

The free induction decay curve up to 0.5 ms obtained at 100° C. was subjected to waveform separation into two curves derived from the $A_{100}$ component and the $B_{100}$ component. The waveform separation was performed by fitting to both a Gaussian model and an exponential model. The percentages of the two components were determined from the curves derived from the components obtained in the measurement.

Using analysis software "TD-NMRA (Version 4.3, Rev. 0.8)" produced by BRUKER, a Gaussian-model fitting was applied to the $A_{100}$ component, and an exponential model fitting was applied to the $B_{100}$ component in conformity with the product manual.

The following equation was used in the fitting.

$$Y = A \times \exp\left(-\frac{1}{2} \times \left(\frac{t}{T_A}\right)^2\right) + B \times \exp\left(-\frac{t}{T_B}\right) \quad \text{[Math. 1]}$$

In the formula, A represents the percentage of the $A_{100}$ component, B represents the percentage of the $B_{100}$ component, $T_A$ represents the relaxation time of the $A_{100}$ component, $T_B$ represents the relaxation time of the $B_{100}$ component, and t represents time.

The $A_{100}$ component and the $B_{100}$ component are components defined in order of shorter relaxation time in pulse NMR measurement. The value of the relaxation time of each component is not limited. Usually, the relaxation time of the $A_{100}$ component is less than 0.020 ms, and the relaxation time of the $B_{100}$ component is 0.020 ms or more.

(4) Weight Average Molecular Weight Measurement

A sample was dissolved in THF, and filtered through a filter having a pore size of 0.2 μm before the weight average molecular weight was measured using a GPC unit (pump unit: PU-4180, detector unit: RI-4030, column oven: CO-4065) produced by JASCO Corporation and SHODEX columns LF-804 (two columns connected). The measurement was performed by eluting the sample at a measurement flow rate of 0.7 ml/min and an oven temperature of 40° C. and determining the weight average molecular weight using a calibration curve base generated with standard polystyrene equivalent.

(Preparation of Melt Additive X1)

Raw material polyethylene (5 kg) was fed and melted in a 23-L small polymerizer equipped with a thermometer, a manometer, a stirring device, a gas inlet tube, and a gas exhaust tube. After the internal temperature reached 145° C., the stirring device was set to 250 rotations/min, and air was introduced into the molten product at 1.0 L/min. The raw material polyethylene used was Hi-WAX 800P (produced by Mitsui Chemicals, Inc., molecular weight 8,000, density 970 kg/m$^3$, crystallinity 84%, melting point 127° C., softening point 140° C.). The pressure inside the polymerizer was adjusted to 0.69 MPa via a control valve on the gas exhaust tube side. While air was introduced, the reaction temperature was maintained at 145° C., the stirring speed was maintained at 250 rotations/min, and the pressure was maintained at 0.69 MPa. The reaction was terminated after five hours, whereby a melt additive X1 was obtained. Here, the crystallinity of the polyethylene was measured by X-ray diffractometry.

(Preparation of Melt Additive Y1)

A melt additive Y1 was obtained in the same manner as the melt additive X1 except that instead of Hi-WAX 800P, Hi-WAX 720P (produced by Mitsui Chemicals, Inc., molecular weight 7,200, density 920 g/m$^3$, crystallinity 60%, melting point 113° C., softening point 118° C.) was used as the polyethylene.

(Melt Additive Evaluation)

(1) $^1$H NMR Spectrum

The obtained melt additive was dissolved in o-dichlorobenzene-d$_4$ at 130° C. A 400 MHz $^1$H NMR spectrum was measured by solution NMR using a Bruker spectrometer AV400 model at 130° C. to measure the area ratio of a peak B observed in the range of 0.6 to 1.0 ppm to a peak A observed in the range of 9.5 to 10 ppm.

(2) Melting Point

The obtained melt additive was subjected to measurement using a differential scanning calorimetry (DSC) device (produced by TA Instruments—Waters LLC, DSC Q20) at a heating rate of 3° C./min in a temperature range of 20° C. to 200° C. in a nitrogen atmosphere.

(3) Molecular Structure Analysis

An NMR spectrum was used to measure the percentages of the structural units (1) to (3).

Here, X in the formula (2) was at least one of a hydroxy group, a carboxy group, or an ether group (having an alkyl group bonded thereto).

(4) Weight Average Molecular Weight Measurement

The weight average molecular weight was measured by a method in conformity with JIS-K-7367-1 (viscosity method).

(Preparation of Melt Additives X2 to X7)

Melt additives X2 to X7 were obtained by adjusting the molecular structure, the weight average molecular weight (Mw), and the melting point as shown in Table 1. The raw material polyethylenes used were as follows.

Melt additive X2: polyethylene (molecular weight: 9,000, density: 970 kg/m$^3$, crystallinity: 84%, melting point: 133° C., softening point: 142° C.)

Melt additive X3: polyethylene (molecular weight: 7,000, density: 980 kg/m$^3$, crystallinity: 83%, melting point: 131° C., softening point: 140° C.)

Melt additive X4: polyethylene (molecular weight: 9,100, density: 973 kg/m$^3$, crystallinity: 84%, melting point: 134° C., softening point: 143° C.)

Melt additive X5: polyethylene (molecular weight: 2,000, density: 970 kg/m$^3$, crystallinity: 84%, melting point: 124° C., softening point: 129° C.)

Melt additive X6: polyethylene (molecular weight: 4,000, density: 980 kg/m$^3$, crystallinity: 62%, melting point: 128° C., softening point: 135° C.)

Melt additive X7: polyethylene (molecular weight: 7,200, density: 920 kg/m$^3$, crystallinity: 84%, melting point: 113° C., softening point: 118° C.)

(Preparations of Melt Additives Y2 to Y5)

Melt additives Y2 to Y5 were obtained by adjusting the molecular structure, the weight average molecular weight (Mw), and the melting point as shown in Table 1. For melt additives Y2 and Y3, the temperature and pressure during reaction were as shown in Table 1. The raw material polyethylenes used were as follows.

Melt additive Y2: polyethylene (molecular weight: 21,000, density: 890 kg/m$^3$, crystallinity: 84%, melting point: 140° C., softening point: 145° C.)

Melt additive Y3: polyethylene (molecular weight: 1,400, density: 920 kg/m$^3$, crystallinity 84%, melting point: 114° C., softening point: 120° C.)

Melt additive Y4: polyethylene (molecular weight: 18,000, density: 900 kg/m$^3$, crystallinity: 48%, melting point: 91° C., softening point: 99° C.)

Melt additive Y5: polyethylene (molecular weight: 1,600, density: 930 kg/m$^3$, crystallinity: 99.5%, melting point: 109° C., softening point: 114° C.)

Example 1

(Preparation of Resin Composition for Molding)

To 100 parts by mass of the chlorinated vinyl chloride resin A (amount of added chlorine: 10.6% by mass, degree of polymerization: 800) were added 1.0 part by mass of the melt additive X1 and 2.0 parts by mass of a butyltin mercaptan compound (produced by Nitto Kasei Co., Ltd., TVS #1360) as a thermal stabilizer. Further, 10.0 parts by mass of diene rubber particles (methyl methacrylate-butadiene-styrene copolymer, produced by Kaneka Corporation, Kane Ace B-564) as an impact resistance modifier and 8.5 parts by mass of a polyvinyl chloride resin (chlorine content: 56.7% by mass, degree of polymerization: 700) were added and mixed.

Moreover, 1.5 parts by mass of glycerol monostearate (produced by Riken Vitamin Co., Ltd., Rikemal S-100) and 1.0 part by mass of an ester lubricant (produced by Riken Vitamin Co., Ltd., Rikester SL-02) as lubricants were added. They were then uniformly mixed in a super mixer, whereby a resin composition for molding was obtained.

Examples 2 to 13

A resin composition for molding was obtained as in Example 1 except that the amount of the polyvinyl chloride resin (chlorine content: 56.7% by mass, degree of polymerization: 700) added and the type and amount of the melt additive added were changed as shown in Table 1.

Comparative Example 1

A resin composition for molding was obtained as in Example 1 except that the melt additive Y1 was used instead of the melt additive X1.

Comparative Examples 2 to 5

A resin composition for molding was obtained as in Example 1 except that the type and the amount of the melt additive added were changed as shown in Table 1.

(Evaluation)

The resin compositions for molding obtained in the examples and the comparative examples were evaluated as follows. Table 1 shows the results.

(1) Solution NMR Measurement

The obtained resin composition for molding was dissolved in o-dichlorobenzene-d$_4$ at 130° C. A 400 MHz $^1$H NMR spectrum was measured by solution NMR using a Bruker spectrometer AV400 model at 130° C. to measure the area ratio of a peak B observed in the range of 0.6 to 1.0 ppm to a peak A observed in the range of 9.5 to 10 ppm.

(2) Crack Stretching Evaluation

The obtained resin composition for molding was injection-molded in an injection molding machine IS50EP produced by Toshiba Corporation. In injection molding, the resin temperature upon purging was adjusted to the range of 205° C. to 220° C., and injection was performed at an injection speed of 8%, a holding pressure of 30 MPa, a pressure-holding time of one second, and a screw rotation speed of 68 rpm.

A dumbbell-shaped specimen (length: 173.5 mm, width of the middle portion: 10 mm, ends: 20 mm) was prepared such that a resin weld was formed in the middle portion of the specimen.

The specimen was subjected to a crack stretching test until the specimen completely ruptured. The test was performed using EHF-ED1KNX4-4LA produced by Shimadzu Corporation at 23° C., 1 Hz, and a test stress of 75 kgf/cm$^2$. The results were evaluated in accordance with the following criteria. Specifically, the test was performed by repeating the following cycle one time per second (1 Hz): stress application at 10% of the test stress (7.5 kgf/cm$^2$)→tension (stress application) to 75 kgf/cm$^2$ (test stress)→returning to 10% of the test stress. The number of cycles until rupture was evaluated in accordance with the following criteria.

A: Ruptured after 12,000 or more cycles.
B: Ruptured after 10,000 or more and less than 12,000 cycles.
C: Ruptured after 8,000 or more and less than 10,000 cycles.
D: Ruptured after less than 8,000 cycles.

(3) Thermal Meltability Evaluation

The obtained resin composition for molding was subjected to a thermal meltability evaluation using Labo Plastmill 410 (produced by Toyo Seiki Seisaku-Sho, Ltd.) at a set temperature of 195° C., a rotation speed of 50 rpm, preheating of two minutes, and a sample input amount of 63 g. The time (thermal melting speed) at which the maximum value of the measured torque peak waveform was observed was determined, and evaluated in accordance with the following criteria.

A: 5 seconds or less
B: more than 5 seconds and less than 10 seconds
D: 10 seconds or more (4) Surface Gloss Evaluation The gloss (gloss unit) was measured using a spectrophotometer (CM-26dG, produced by Konica Minolta, Inc.) with SAV (Small Area of View: measurement diameter of about φ3 mm), and evaluated in accordance with the following criteria. The light source used was a pulsed xenon lamp.

A: a gloss of 30 GU or more
B: a gloss of 25 GU or more and less than 30 GU
C: a gloss of 20 GU or more and less than 25 GU
D: a gloss of less than 20 GU

TABLE 1

| | | | | | Example | | | | | |
|---|---|---|---|---|---|---|---|---|---|---|
| | | | | | 1 | 2 | 3 | 4 | 5 | 6 |
| Resin composition for molding | Chlorinated polyvinyl chloride resin | Amount of added chlorine | | % by mass | 10.6 | 10.6 | 10.6 | 10.6 | 10.6 | 10.6 |
| | | Molecular weight (Mw) | | — | 100557 | 100557 | 100557 | 100557 | 100557 | 100557 |
| | | Structure | Structural unit (a) —CH$_2$—CHCl— | mol % | 55 | 55 | 55 | 55 | 55 | 55 |
| | | | Structural unit (b) —CH$_2$—CCl$_2$— | mol % | 25 | 25 | 25 | 25 | 25 | 25 |
| | | | Structural unit (c) —CHCl—CHCl— | mol % | 20 | 20 | 20 | 20 | 20 | 20 |
| | Polyvinyl chloride resin | Amount | | parts by mass | 100 | 100 | 100 | 100 | 100 | 100 |
| | | Chlorine content | | % by mass | 56.7 | 56.7 | 56.7 | 56.7 | 56.7 | 56.7 |
| | Melt additive | Amount | | parts by mass | 8.5 | 8.5 | 8.5 | 8.5 | 8.5 | 8.5 |
| | | Production method | Temperature | % by mass | 145 | 145 | 145 | 145 | 145 | 145 |
| | | | Pressure | % by mass | 0.69 | 0.69 | 0.69 | 0.69 | 0.69 | 0.69 |
| | | Structure | Structural unit (1) —CH$_2$—CH$_2$— | parts by mass | 95.80 | 95.80 | 95.80 | 98.7 | 95.80 | 70.32 |
| | | | Structural unit (2) —CH$_2$—CHX— | parts by mass | 4.10 | 3.69 | 3.69 | 1.14 | 3.69 | 29.05 |
| | | | Structural unit (3) —CH$_2$—CHCHO— | % by mass | 0.10 | 0.10 | 0.10 | 0.03 | 0.10 | 0.04 |
| | | Before modification | Crystallinity | % by mass | 84.0 | 84.0 | 84.0 | 83.0 | 84.0 | 84.0 |
| | | After modification | Molecular weight (Mw) | — | 8667 | 10400 | 10400 | 7200 | 10600 | 2480 |
| | | | Melting point | °C. | 126 | 126 | 126 | 126 | 126 | 121 |
| | | | Type | — | X1 | X2 | X2 | X3 | X4 | X5 |
| | | | Amount | parts by mass | 1.0 | 12.0 | 1.0 | 1.0 | 1.0 | 1.0 |
| | Structural unit (2)/Structural unit (a) | | | — | 0.07 | 0.07 | 0.07 | 0.02 | 0.7 | 0.53 |
| | Molecular weight of melt additive/Molecular weight of chlorinated polyvinyl chloride resin | | | — | 0.09 | 0.10 | 0.10 | 0.07 | 0.11 | 0.02 |
| | Impact resistance modifier | Diene rubber particles | | parts by mass | 10.0 | 10.0 | 10.0 | 10.0 | 10.0 | 10.0 |
| | Thermal stabilizer | Butyltin mercaptan compound | | parts by mass | 2.0 | 2.0 | 2.0 | 2.0 | 2.0 | 2.0 |
| | Lubricant | Glycerol monostearate | | parts by mass | 1.5 | 1.5 | 1.5 | 1.5 | 1.5 | 1.5 |
| | | Ester lubricant | | parts by mass | 1.0 | 1.0 | 1.0 | 1.0 | 1.0 | 1.0 |
| Evaluation | Chlorinated polyvinyl chloride resin | Pulse NMR 100° C. Percentage | A$_{100}$ | % | 88.0 | 88.0 | 88.0 | 88.0 | 88.0 | 88.0 |
| | | | B$_{100}$ | % | 12.0 | 12.0 | 12.0 | 12.0 | 12.0 | 12.0 |
| | Melt additive | Solution NMR | Area of peak B/Area of peak A | — | 35 | 34 | 34 | 33 | 5 | 947 |
| | Resin composition for molding | Solution NMR | Area of peak B/Area of peak A | — | 800 | 5 | 500 | 950 | 951 | 950 |
| | Crack stretching evaluation | | | Measured value | 12600 | 10100 | 12000 | 11500 | 12000 | 9900 |
| | | | | Rating | A | B | A | B | A | C |
| | Thermal meltability | | | Measured value | 8 | 5 | 6 | 7 | 6 | 7 |
| | | | | Rating | B | A | B | B | B | B |
| | Surface gloss | | | Measured value | 33 | 38 | 37 | 34 | 37 | 22 |
| | | | | Rating | A | A | A | A | A | C |

TABLE 1-continued

| | | | | | Example | | | | | |
|---|---|---|---|---|---|---|---|---|---|---|
| | | | | 7 | 8 | 9 | 10 | 11 | 12 | 13 |
| Resin composition for molding | Chlorinated polyvinyl chloride resin | Amount of added chlorine | | % by mass | 10.6 | 10.6 | 10.6 | 10.6 | 10.6 | 10.6 | 10.6 |
| | | Molecular weight (Mw) | | — | 100557 | 100557 | 100557 | 100557 | 100557 | 100557 | 100557 |
| | | Structure | Structural unit (a) —CH$_2$—CHCl— | mol % | 55 | 55 | 55 | 55 | 55 | 55 | 55 |
| | | | Structural unit (b) —CH$_2$—CCl$_2$— | mol % | 25 | 25 | 25 | 25 | 25 | 25 | 25 |
| | | | Structural unit (c) —CHCl—CHCl— | mol % | 20 | 20 | 20 | 20 | 20 | 20 | 20 |
| | Polyvinyl chloride resin | Amount | | parts by mass | 100 | 100 | 100 | 100 | 100 | 100 | 100 |
| | | Chlorine content | | % by mass | 56.7 | 56.7 | 56.7 | 56.7 | 56.7 | 56.7 | 56.7 |
| | Melt additive | Amount | | parts by mass | 8.5 | 8.5 | 8.5 | 5.5 | 0.5 | 25.0 | 35.0 |
| | | Production method | Temperature | °C. | 145 | 145 | 145 | 145 | 145 | 145 | 145 |
| | | | Pressure | Mpa | 0.69 | 0.69 | 0.69 | 0.69 | 0.69 | 0.69 | 0.69 |
| | | Structure | Structural unit (1) —CH$_2$—CH$_2$— | mol % | 75.06 | 95.80 | 95.80 | 95.80 | 95.80 | 95.80 | 95.80 |
| | | | Structural unit (2) —CH$_2$—CHX— | mol % | 24.42 | 3.63 | 3.69 | 3.69 | 3.69 | 3.69 | 3.69 |
| | | | Structural unit (3) —CH$_2$—CHCHO— | mol % | 0.02 | 0.10 | 0.10 | 0.10 | 0.10 | 0.10 | 0.10 |
| | | Before modification | Crystallinity | % | 62.0 | 84.0 | 84.0 | 84.0 | 84.0 | 84.0 | 84.0 |
| | | After modification | Molecular weight (Mw) | — | 4100 | 10400 | 10403 | 7300 | 10400 | 10400 | 10400 |
| | | | Melting point | °C. | 126 | 126 | 126 | 126 | 126 | 126 | 126 |
| | | Type | | — | X6 | X2 | X2 | X7 | X2 | X2 | X2 |
| | | Amount | | parts by mass | 1.0 | 5.0 | 10.0 | 15.0 | 1.0 | 1.0 | 1.0 |
| | Structural unit (2)/Structural unit (a) | | | — | 0.44 | 0.07 | 0.07 | 0.07 | 0.07 | 0.07 | 0.07 |
| | Molecular weight of melt additive/Molecular weight of chlorinated polyvinyl chloride resin | | | — | 0.04 | 0.10 | 0.10 | 0.07 | 0.10 | 0.10 | 0.10 |
| | Impact resistance modifier | Diene rubber particles | | parts by mass | 10.0 | 10.0 | 10.0 | 10.0 | 10.0 | 10.0 | 10.0 |
| | Thermal stabilizer | Butyltin mercaptan compound | | parts by mass | 2.0 | 2.0 | 2.0 | 2.0 | 2.0 | 2.0 | 2.0 |
| | Lubricant | Glycerol monostearate | | parts by mass | 1.5 | 1.5 | 1.5 | 1.5 | 1.5 | 1.5 | 1.5 |
| | | Ester lubricant | | parts by mass | 1.0 | 1.0 | 1.0 | 1.0 | 1.0 | 1.0 | 1.0 |
| | Chlorinated polyvinyl chloride resin | Pulse NMR 100° C. | Percentage | % | 88.0 | 88.0 | 88.0 | 88.0 | 88.0 | 88.0 | 88.0 |
| | Melt additive | | | % | 12.0 | 12.0 | 12.0 | 12.0 | 12.0 | 12.0 | 12.0 |
| | Resin composition for molding | Solution NMR | Area of peak B/Area of peak A A$_{100}$ | — | 1050 | 35 | 35 | 35 | 35 | 35 | 35 |
| | | Solution NMR | Area of peak B/Area of peak A B$_{100}$ | — | 999 | 250 | 52 | 318 | 951 | 885 | 990 |
| Evaluation | Crack stretching evaluation | | | Measured value | 8500 | 11000 | 10800 | 8800 | 12200 | 13000 | 10200 |
| | | | | Rating | C | B | B | C | A | A | B |
| | Thermal meltability | | | Measured value | 8 | 5 | 5 | 4 | 8 | 8 | 8 |
| | | | | Rating | B | A | A | A | B | B | B |
| | Surface gloss | | | Measured value | 27 | 35 | 36 | 29 | 37 | 36 | 36 |
| | | | | Rating | B | A | A | B | A | A | A |

TABLE 1-continued

| | | | | | Comparative Example | | | | |
|---|---|---|---|---|---|---|---|---|---|
| | | | | | 1 | 2 | 3 | 4 | 5 |
| Resin composition for molding | Chlorinated polyvinyl chloride resin | Amount of added chlorine | | % by mass | 10.6 | 10.6 | 10.6 | 10.6 | 10.6 |
| | | Molecular weight (MW) | | — | 100557 | 100557 | 100557 | 100557 | 100557 |
| | | Structure | Structural unit (a) —$CH_2$—CHCl— | mol % | 55 | 55 | 55 | 55 | 55 |
| | | | Structural unit (b) —$CH_2$—$CCl_2$— | mol % | 25 | 25 | 25 | 25 | 25 |
| | | | Structural unit (c) —CHCl—CHCl— | mol % | 20 | 20 | 20 | 20 | 20 |
| | Polyvinyl chloride resin | Amount | | parts by mass | 100 | 100 | 100 | 100 | 100 |
| | | Chlorine content | | % by mass | 56.7 | 56.7 | 56.7 | 56.7 | 56.7 |
| | Melt additive | Amount | | parts by mass | 8.5 | 8.5 | 8.5 | 8.5 | 8.5 |
| | | Production method | Temperature | ° C. | 145 | 120 | 180 | 145 | 145 |
| | | | Pressure | MPa | 0.69 | 0.69 | 0.69 | 0.69 | 0.69 |
| | | Structure | Structural unit (1) —$CH_2$—$CH_2$— | mol % | 70.30 | 98.90 | 93.80 | 60.30 | 99.80 |
| | | | Structural unit (2) —$CH_2$—CHX— | mol % | 29.07 | 0.54 | 0.27 | 24.60 | 0.09 |
| | | | Structural unit (3) —$CH_2$—CHCHO— | mol % | 0.04 | 0.50 | 0.10 | 14.60 | 0.09 |
| | | Before modification | Crystallinity | % | 60.0 | 84.0 | 84.0 | 48.0 | 99.5 |
| | | After modification | Molecular weight (Mw) | — | 7692 | 21536 | 1538 | 18462 | 1592 |
| | | | Melting point | ° C. | 110 | 136 | 111 | 90 | 107 |
| | | Type | | — | Y1 | Y2 | Y3 | Y4 | Y5 |
| | | Amount | | parts by mass | 1.0 | 1.0 | 1.0 | 1.0 | 1.0 |
| | Structural unit (2)/Structural unit (a) | | | — | 0.53 | 0.01 | 0.00 | 0.45 | 0.00 |
| | Molecular weight of melt additive/Molecular weight of chlorinated polyvinyl chloride resin | | | — | 0.08 | 0.21 | 0.02 | 0.18 | 0.02 |
| | Impact resistance modifier | Diene rubber particles | | parts by mass | 10.0 | 10.0 | 10.0 | 10.0 | 10.0 |
| | Thermal stabilizer | Butylin mercatan compound | | parts by mass | 2.0 | 2.0 | 2.0 | 2.0 | 2.0 |
| | Lubricant | Glycerol monostearate | | parts by mass | 1.5 | 1.5 | 3.5 | 1.5 | 1.5 |
| | | Ester lubricant | | parts by mass | 1.0 | 1.0 | 1.0 | 1.0 | 1.0 |
| Evaluation | Chlorinated polyvinyl chloride resin | Pulse NMR 100° C. | Percentage | $A_{100}$ % | 88.0 | 83.0 | 88.0 | 83.0 | 38.0 |
| | | | | $B_{100}$ % | 12.0 | 12.0 | 12.0 | 12.0 | 12.0 |
| | | Solution NMR | Area of peak B/Area of peak A | — | 0.5 | 0.7 | 0.5 | 1.0 | 0.3 |
| | | Solution NMR | Area of peak B/Area of peak A | — | 1.0 | 0.3 | 0.4 | 1400 | 0.2 |
| | Melt additive | | | Measured value | 1150 | 7400 | 6050 | 1500 | 4800 |
| | Resin composition for molding | | | Rating | D | D | D | D | D |
| | Crack stretching evaluation | | | Measured value | 7500 | 7400 | 6050 | 7000 | 4800 |
| | | | | Rating | D | D | D | D | D |
| | Thermal meltability | | | Measured value | 13 | 12 | 18 | 12 | 17 |
| | | | | Rating | D | D | D | D | D |
| | Surface gloss | | | Measured value | 12 | 19 | 13 | 17 | 12 |
| | | | | Rating | D | D | D | D | D |

INDUSTRIAL APPLICABILITY

The present invention can provide a resin composition for molding having excellent thermal meltability and capable of providing a molded article that is less likely to crack from a resin weld during use and has excellent surface gloss, and a molded article including the resin composition for molding.

The invention claimed is:

1. A resin composition for molding, comprising:
a chlorinated polyvinyl chloride resin;
a polyvinyl chloride resin; and
a melt additive,
the resin composition having an area ratio of a peak B observed in a range of 0.6 to 1.0 ppm to a peak A observed in a range of 9.5 to 10 ppm (Area of peak B/Area of peak A) of 1 to 1,000 when a $^1$H NMR spectrum is measured by solution NMR,
an amount of the polyvinyl chloride resin being 0.5 to 30 parts by mass based on 100 parts by mass of the chlorinated polyvinyl chloride resin,
the melt additive containing structural units represented by the following formulas (1) to (3),

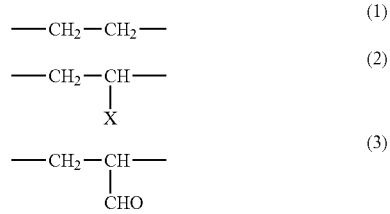

wherein in the formula (2), X represents at least one selected from the group consisting of an alkyl group, a halogen group, a carboxy group, a hydroxy group, an acetyl group, an acryloyl group, a cyano group, an acrylamide group, a phenyl group, and an ether group, and
the melt additive having a weight average molecular weight of 1,000 to 1,000,000 and having a melting point of 60 to 150° C.

2. The resin composition for molding according to claim 1,
wherein the chlorinated polyvinyl chloride resin contains structural units (a) to (c) represented by the following formulas (a) to (c), the structural unit (a) being present in a proportion of 5 mol % or more and 90 mol % or less, the structural unit (b) being present in a proportion of 5 mol % or more and 40 mol % or less, the structural unit (c) being present in a proportion of 5 mol % or more and 55 mol % or less, based on the total number of moles of the structural units (a), (b), and (c), and the polyvinyl chloride resin is contained in an amount of 1 to 30 parts by mass based on 100 parts by mass of the chlorinated polyvinyl chloride resin:

3. The resin composition for molding according to claim 2,
wherein the melt additive has an area ratio of a peak B observed in a range of 0.6 to 1.0 ppm to a peak A observed in a range of 9.5 to 10 ppm (Area of peak B/Area of peak A) of 1 to 1,000 when a $^1$H NMR spectrum is measured by solution NMR.

4. The resin composition for molding according to claim 3,
wherein the melt additive is contained in an amount of 0.01 to 18 parts by mass based on 100 parts by mass of the chlorinated polyvinyl chloride resin.

5. A molded article molded from the resin composition for molding according to claim 4.

6. A molded article molded from the resin composition for molding according to claim 3.

7. The resin composition for molding according to claim 2,
wherein the melt additive is contained in an amount of 0.01 to 18 parts by mass based on 100 parts by mass of the chlorinated polyvinyl chloride resin.

8. A molded article molded from the resin composition for molding according to claim 7.

9. A molded article molded from the resin composition for molding according to claim 2.

10. The resin composition for molding according to claim 1,
wherein the melt additive has an area ratio of a peak B observed in a range of 0.6 to 1.0 ppm to a peak A observed in a range of 9.5 to 10 ppm (Area of peak B/Area of peak A) of 1 to 1,000 when a $^1$H NMR spectrum is measured by solution NMR.

11. The resin composition for molding according to claim 10,
wherein the melt additive is contained in an amount of 0.01 to 18 parts by mass based on 100 parts by mass of the chlorinated polyvinyl chloride resin.

12. A molded article molded from the resin composition for molding according to claim 11.

13. A molded article molded from the resin composition for molding according to claim 10.

14. The resin composition for molding according to claim 1,
wherein the melt additive is contained in an amount of 0.01 to 18 parts by mass based on 100 parts by mass of the chlorinated polyvinyl chloride resin.

15. A molded article molded from the resin composition for molding according to claim 14.

16. A molded article molded from the resin composition for molding according to claim 1.

* * * * *